United States Patent Office
3,519,608
Patented July 7, 1970

3,519,608
UNSATURATED - ACYLOXYALKYL - 2 - OXA-
ZOLIDINONES, POLYMERS THEREOF AND
METHODS OF MAKING THE MONOMERS
AND POLYMERS
Everett J. Kelley, Moorestown, N.J., assignor to Rohm
& Haas Company, Philadelphia, Pa., a corporation of
Delaware
No Drawing. Filed Jan. 7, 1965, Ser. No. 424,135
Int. Cl. C08f 7/00, 15/18
U.S. Cl. 260—86.1         12 Claims This application concerns new compounds which may be generally designated 4 (or 5)-(unsaturated-acyloxy-alkyl)-2-oxazolidinones. It also concerns polymers of the new compounds and methods of making both the monomers and polymers. The 2-oxazolidinones are also referred to as 2-oxazolidones.

The monomeric compounds of the present invention are those having the formula

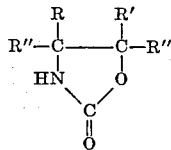

(I)

wherein R is selected from the group consisting of H and $(C_1-C_4)$-alkyl groups, R' is selected from the group consisting of H and $(C_1-C_4)$-alkyl groups, and one of the substituents R" is H and the other is a member of the formula

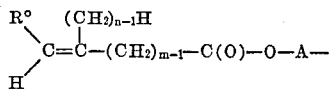

wherein
$n$ is an integer having a value of 1 to 2,
$m$ is an integer having a value of 1 to 3,
$R^\circ$ is H except that it is selected from the group consisting of H and methyl when $m$ is 2, and
A is an alkylene group having 1 to 4 carbon atoms.

Preferred monomers are those of the formula

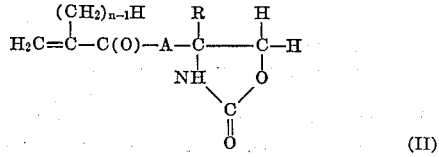

(II)

wherein
$n$ is an integer having a value of 1 to 2,
A is an alkylene group having 1 to 4 carbon atoms, and
R is —$(CH_2)_{x-1}$—H where $x$ is an integer having a value of 1 to 2.

Various ways may be used for preparing the monomers of the present invention. One of the most effective is to react a 4(or 5)-hydroxyalkyl-2-oxazolidinone of Formula III with an acid halide of Formula IV following

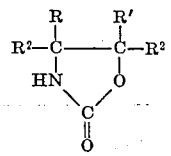

(III)

wherein one of the $R^2$ substituents is H and the other is HOA—;

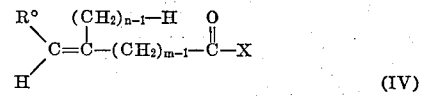

(IV)

where A, R, R', $R^\circ$, $n$, and $m$ are as defined hereinabove and X is a halogen, especially being selected from the group consisting of chlorine and bromine.

The compound of Formula III is dissolved in an inert solvent, such as ethyl acetate, acetone, acetonitrile or a halogenated hydrocarbon, examples of which include chloroform, ethylene dichloride, and carbon tetrachloride; then a hydrogen halide acceptor, such as a tertiary amine, e.g. triethylamine, or tripropylamine, is added and, optionally, a polymerization inhibitor. The use of an inhibitor is desirable when making the preferred compounds of Formula II. Then the acyl halide of Formula IV is added while maintaining the temperature in the desired range, such as from 35 to 80° C. The amount of acceptor and halide reactant should be approximately the stoichiometric equivalents of the reactant of Formula III used. The time for reaction depends on the size of the batch, the rapidity of addition of reactant IV and the facilities for controlling the batch temperature. After completion of the reaction, the batch is cooled and filtered. The product of Formula I may then be recovered by distilling solvent under vacuum.

Some of the starting reactants of Formula III are known compounds which are available. However, they may be made readily by the reaction of a dialkyl carbonate, such as diethyl carbonate with an aliphatic amino-diol of the Formula V

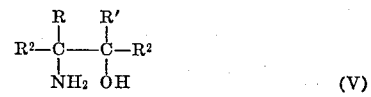

(V)

wherein R R' and $R^2$ are as defined above.

Examples of the compounds of Formula V include:

2-amino-1,3-dihydroxy-propane
2-amino-1,3-dihydroxy-2-methyl-propane
2-amino-1,6-dihydroxy-hexane
3-amino-1,2-dihydroxy-propane
2-amino-1,3-dihydroxy-2-ethyl-propane
2-amino-1,3-dihydroxy-2-isopropyl-propane
2-amino-1,3-dihydroxy-2-propyl-propane
2-amino-1,3-dihydroxy-butane
2-amino-1,4-dihydroxy-butane
2-amino-1,5-dihydroxy-2-butyl-pentane
2-amino-1,4-dihydroxy-2-butyl-butane
1-amino-2,3-dihydroxy-hexane
3-amino-1,2-dihydroxy-hexane
2-amino-1,6-dihydroxy-hexane The amount of dialkyl carbonate used in the reaction with the amino-diol of Formula V is approximately one mole per mole of the amino-diol. No solvent is needed. The two reactants are mixed together and heated to a temperature in the range of 50° C. to 130° C. The alcohol liberated may be distilled, leaving the oxazolidinones of Formula III. The reaction may be represented as follows:

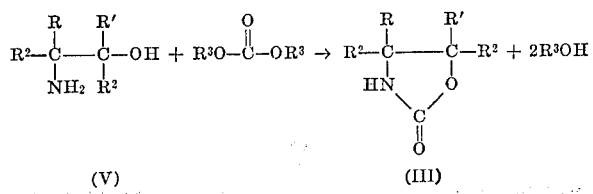

(V)   (III)

Examples of the compounds of Formula IV that may be reacted with the compounds of Formula III include:

Acrylyl chloride or bromide
Methacrylyl chloride or bromide
Crotonyl chloride
4-pentenoyl chloride
3-butenoyl chloride Novel polymers of the Formula I monomers can be made by bulk, solvent or aqueous emulsion techniques using organic solvents, such as acetone, dioxane, dimethylformamide and acetonitrile, and azo catalysts such as diazodiisobutyronitrile and dimethyl - $\alpha,\alpha'$ - azodiisobutyrate. The proportion of azo catalyst or initiator can be between about 0.1% and 5%, and is preferably between about 0.5 and 1.5%, based on the weight of the total molymerizable materials.

The compounds of Formula I can be copolymerized with various other ethylenically unsaturated monomers, and especially the monoethylenically unsaturated monomers adapted to produce linear copolymers. For the making of copolymers, any free radical catalyst or initiator may be used, not only the azo type, but also organic peroxides, such as benzoyl peroxide, organic hydroperoxides, such as tert-butyl hydroperoxide, hydrogen peroxide, and persulfates, such as the ammonium and alkali metal persulfate. Thus, copolymers may be made containing from about ½% to 99.5% by weight of a compound of Formula I with at least one of the following monomers: vinyl acetate, acrylonitrile, acrylamide, methacrylamide, styrene, vinyl toluene, vinylidene chloride, vinyl chloride, vinyl laurate, esters of acrylic acid or methacrylic acid having from 1 to 18 carbon atoms in the alcohol moiety such as methyl methacrylate, methyl acrylate, ethyl acrylate, butyl acrylate or methacrylate, cyclohexyl acrylate or methacrylate, 2-ethylhexyl acrylate or methacrylate, dodecyl acrylate or methacrylate, and octadecyl acrylate or methacrylate.

The novel polymers and copolymers of the Formula I monomers are useful in the formulation of compositions such as coatings, adhesives, sealers and impregnants for application to such materials as metals, wood, plastics, textiles and leather. The polymers can be employed in conjunction with other polymeric materials for the production of special compositions for special uses, for example, in acrylic coating compositions having improved adhesion to various substrates. Emulsion polymers of a compound of Formula I are useful for the binding of pigments, for the stabilization of wool fabrics against shrinkage on laundering, and for the binding of fibers in non-woven fabrics. For this purpose, they may be blended with a water-dispersible polyepoxide to produce non-woven fabrics highly resistant to discoloration by chlorine-bleaching or ironing.

Copolymers containing about 5–25% by weight of the novel monomers can be mixed with polyepoxides for the preparation of insoluble and infusible cross-linked coatings. Suitable water-dispersible and/or organic solvent-soluble epoxide resins are described in U.S. Pats. 2,324,483; 2,444,333; 2,543,419; 2,730,427; and 2,752,269. Many of the resins are available from Shell Chemical Corporation ("Epon" resins) and Ciba Company ("Araldite" resins).

The novel polymers of the Formula I monomers, and especially those of Formula II have several advantages over known polymers which are useful for similar applications, including the following:

They can be made from available raw materials.
Their preparation is relatively fast and simple.
They are adaptable for use both in aqueous systems and in organic solvent systems.
They can be used in the presence of a great variety of pigments without harmfully reacting with them.

To assist those skilled in the art to practice the present invention, the following modes of operation are suggested by way of illustration, parts and percentages being by weight and the temperature in ° C. unless otherwise specifically noted.

(1)(a) Preparation of 4-methacryloxymethyl-4-methyl oxazolidinone-2.—4-hydroxymethyl-4-methyl - oxazolidinone - 2 (98 gms.: 0.75 mole), ethylene dichloride (300 mls.), triethylamine (83.5 gms.: 0.825 mole), and paramethoxyphenol (0.15 gm.) are charged to a one-liter, three-necked flask equipped with stirrer, thermometer, dropping funnel, and reflux condenser. Methacrylyl chloride (86 gms.: 0.825 mole) is then added in a dropwise manner over a 20-minute period with stirring and cooling to 40–45° C. The mixture is stirred one hour at 40–45° C. followed by one hour at 50–60° C. The batch is cooled and filtered. The filter cake of triethylamine hydrochloride is washed once with additional ethylene dichloride (100 mls.). The combined filtrates are washed twice with water (100 ml. portions) and once with 5% NaHCO₃ solution (100 ml. portion). An additional 0.15 gm. of monomethyl ether of hydroquinone is added as polymerization inhibitor and the oil layer is stripped under vacuo keeping the pot temperature at or below 30° C. to obtain the desired 4-methacryloxymethyl-4-methyl-oxazolidone-2 as an undistilled oil (128 gms.).

Analysis:
Beilstein Test for Cl: negative
Percent nitrogen: found 6.35, calc'd 7.03
Bromine Number (cgms. Br./gm. sample): found 85.2, calc'd 80.3.

(b) In the same way, 4-(4-acryloxybutyl)-2-oxazolidinone is prepared by reacting acrylyl bromide (111 gm.) with 4-(4-hydroxybutyl)-2-oxazolidinone (118 gm.).

(c) Part (a) is repeated in order to produce 4-[(4-pentenoyloxy)methyl]-5-methyl-2-oxazolidinone using 98 gms. of 4-pentenoyl chloride and 98 gms. of 4-(hydroxymethyl)-5-methyl-2-oxazolidinone.

(d) In the same way 4-(2-crotonyloxyethyl)-2-oxazolidinone is prepared using 86 gms. of crotonyl chloride and 98 gms. of 4-(2-hydroxyethyl)-2-oxazolidinone.

(e) In the same way 4-(acryloxymethyl)-4-methyl-2-oxazolidinone is prepared by reacting 75 gms. of acrylyl chloride with 98 gms. of 4-hydroxymethyl-4-methyl-2-oxazolidinone.

(f) In the same way 5-methacryloxymethyl)-2-oxazolidinone is prepared by reacting 86 gms. of methacrylyl chloride with 88 gms. 5-hydroxymethyl-2-oxazolidinone.

(2) 10 gms. of each of the monomers of (1)(a) through (f) inclusive are placed in separate glass polymerization vessels each containing 100 ml. of methyl ethyl ketone and there is added to each vessel 0.05 gm. of azobisisobutyronitrile. By appropriate heating and/or cooling the monomers are homopolymerized at temperatures of 45 to 60° C.

(3)(a) A solution copolymer composition is prepared in the following manner. Toluene (233 gms.) is charged to a glass polymerization flask equipped with a stirrer, reflux condenser, thermometer, and dropping funnel. The toluene is stirred and heated to 110° C. A monomer-catalyst solution consisting of the following materials:

| | Grams |
|---|---|
| n-Butyl methacrylate | 203.7 |
| Methyl methacrylate | 135.8 |
| 4-methacryloxymethyl-4-methyl-oxazolidinone-2 | 10.5 |
| Azobisisobutyronitrile | 1 4 | is then added to the flask at an even rate over a two-hour period with continued stirring and heating at 110–115° C. A catalyst solution of 1.92 gms. of azobisisobutyronitrile in 53 gms. of toluene is then added to the batch in three equal portions, two, three, and four hours after the addition of the monomer mixture is completed. The mixture is heated an additional three hours, cooled, and diluted with more toluene (180 gms.). The final solution contains about 40% solids, is of a yellow color, and has a Brookfield viscosity of 600 cps. at 25° C.

(b) A copolymer is prepared by the procedure of Part (a) using as the monomer/catalyst charge:

| | Grams |
|---|---|
| Acrylonitrile | 182 |
| n-Butyl acrylate | 137 |
| 4-(4-acryloxybutyl)-2-oxazolidinone | 17 |
| N-methylolacrylamide | 14 |
| Azobisisobutyronitrile | 1.5 |

(c) A copolymer is prepared by the procedure of Part (a) using as the monomer/catalyst charge:

| | Grams |
|---|---|
| Ethyl methacrylate | 120 |
| Styrene | 110 |
| Ethyl acrylate | 90 |
| 4-(4-pentenoyloxymethyl)-5-methyl-2-oxazolidinone | 30 |
| Dimethyl azodiisobutyrate | 1.8 |

(d) A copolymer is prepared by the procedure of Part (a) using as the monomer/catalyst charge:

| | Grams |
|---|---|
| Vinyl acetate | 150 |
| Vinyl chloride | 70 |
| Ethyl acrylate | 100 |
| 4-(2-crotonyloxyethyl)-2-oxazolidinone | 30 |
| Azobisisobutyronitrile | 1.7 |

(e) A copolymer is prepared by the procedure of Part (a) using as the monomer/catalyst charge:

| | Grams |
|---|---|
| Methyl methacrylate | 130 |
| Vinyltoluene | 105 |
| Ethyl acrylate | 80 |
| Methacrylic acid | 5 |
| 4-(acryloxymethyl)-4-methyl-2-oxazolidinone | 30 |
| Azobisisobutyronitrile | 1.6 |

(f) A copolymer is prepared by the procedure of Part (a) using as the monomer/catalyst charge:

| | Grams |
|---|---|
| n-Butyl methacrylate | 203.7 |
| Methyl methacrylate | 135.8 |
| 5-methacryloxymethyl-2-oxazolidinone | 10.5 |
| Azobisisobutyronitrile | 1.4 |

(4) Each of several panels of steel primed with a commercial mixture of an epoxy-resin and a melamine/formaldehyde condensate is coated with a separate one of the copolymer solutions of (3)(a) through (f) inclusive. The panels are dried at room temperature and are then baked at 150° C. for a half hour. The protective coatings thereby obtained are glossy, transparent and adherent.

(5) An aqueous dispersion of an emulsion copolymer is prepared as follows. To a one-liter, three-necked, round-bottom flask fitted with a reflux condenser, thermometer, Teflon blade agitator, and nitrogen inlet is charged water (570 gms.), to-octylphenoxypoly(40)ethoxyethanol (17 gms. of 70% solution), ethyl acrylate (132 gms.), methyl metaacrylate (64 gms.), and 4-methacryloxymethyl-4-methyl oxazolidone-2 (4 gms.) in that order. The system is swept with nitrogen and the temperature adjusted to 15° C. with an ice bath. Polymerization is initiated by the addition of freshly prepared solutions of ammonium persulfate (0.2 gm. in 10 mls. $H_2O$), and ferrous sulfate (2.0 mls. of 0.1% aqueous solution of $FeSO_4 \cdot 7H_2O$) in the given sequence. The polymerization exotherm carries the batch temperature to 57° C. in 20 minutes. When the batch temperature drops 10° C. (air cooling only), an ice bath is applied and the dispersion cooled to room temperature. The dispersion solids at this time is 25.7% and is increased to 46.0% by evaporation. The dispersion pH is adjusted to 9.5 by the addition of conc. $NH_4OH$.

(6) The dispersion obtained in (5) above is coated on clean, sanded white pine panels and air-dried for 20 hours. Well-adhered protective films are obtained.

(7) The procedure of (5) above is repeated using as the monomers 125 gms. vinyl acetate, 67 gms. ethyl acrylate, 2 gms. itaconic acid, and 6 gms. 4-(2-crotonyloxyethyl)-2-oxazolidinone. A white water-base paint made from the dispersion thus obtained in conventional fashion using titanium dioxide pigment and applied to wood and masonry surfaces with subsequent air-drying adheres well to the surfaces.

I claim:
1. A compound of the formula

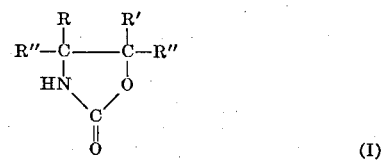

(I)

wherein
R is selected from the group consisting of H and $(C_1-C_4)$-alkyl groups,
R′ is selected from the group consisting of H and $(C_1-C_2)$-alkyl groups, and one of the substituents R″ is H and the other is a member of the formula

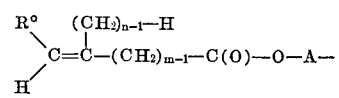

wherein
$n$ is an integer having a value of 1 to 2,
$m$ is an integer having a value of 1 to 3,
R° is H except that it is selected from the group consisting of H and methyl when $m$ is 2, and
A is an alkylene group having 1 to 4 carbon atoms.

2. As a composition of matter, a polymer of a compound as defined in claim 1.

3. As a composition of matter, a copolymer of at least one compound as defined in claim 1 and at least one other copolymerizable ethylenically unsaturated monomer.

4. As a composition of matter, a copolymer of about 0.2 to 99.8% by weight of at least one compound as defined in claim 1 and the balance, to make 100% by weight, of at least one other copolymerizable ethylentically unsaturated monomer.

5. A compound of the formula

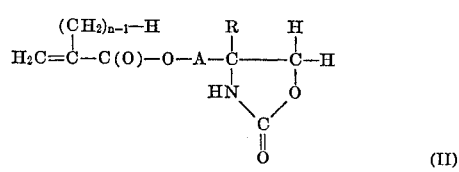

(II)

wherein
$n$ is an integer having a value of 1 to 2,
A is an alkylene group having 1 to 4 carbon atoms, and
R is—$(CH_2)_{x-1}$—H where $x$ is an integer having a value of 1 to 2.

6. As a composition of matter, a polymer of a compound as defined in claim 5.

7. As a composition of matter, a coplymer of about 0.2 to 99.8% by weight of at least one compound of the formula

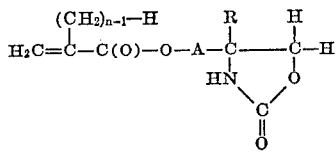 (II)

wherein

*n* is an integer having a value of 1 to 2,

A is an alkylene group having 1 to 4 carbon atoms, and

R is —$(CH_2)_{x-1}$—H where *x* is an integer having a value of 1 to 2, with at least one other copolymerizable ethylentically unsaturated compound having a group of the formula $H_2C=C<$.

8. 4-methacryloxymethyl-4-methyl-2-oxazolidinone.

9. As a composition of matter, a polymer of 4-methacryloxymethyl-4-methyl-2-oxazolidinone.

10. As a composition of matter, a coplymer of about 0.2 to 99.8% by weight of 4-methacryloxymethyl-4-methyl-2-oxazolidinone with at least one other copolymerizable ethylenically unsaturated compound having a group of the formula $H_2C=C<$.

11. A compound having the formula

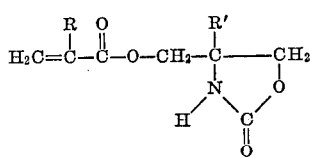

wherein

R is H or methyl, and

R′ is H, methyl or ethyl.

12. A polymer of a compound having the formula

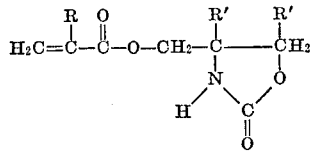

wherein

R is H or methyl, and

R′ is H, methyl or ethyl.

No references cited.

HARRY WONG, JR., Primary Examiner

U.S. Cl. X.R.

260—88.3, 85.5, 41, 86.7, 86.3, 836, 80.72, 307; 117—132, 148, 138.8, 139.5, 140, 142